United States Patent [19]

Wood

[11] 4,011,886

[45] Mar. 15, 1977

[54] SLEEVE VALVE

[75] Inventor: Charles D. Wood, San Antonio, Tex.

[73] Assignee: Southwest Research Institute, San Antonio, Tex.

[22] Filed: May 14, 1975

[21] Appl. No.: 577,468

Related U.S. Application Data

[63] Continuation of Ser. No. 365,629, May 31, 1973, abandoned.

[52] U.S. Cl. .............................. 137/492.5; 137/469
[51] Int. Cl.² ..................................... F16K 31/124
[58] Field of Search .......... 137/596.14, 492.5, 492, 137/533, 532, 533.17, 533.13, 534, 533.21, 469, 529, 514; 251/338, 337, 284

[56] References Cited

UNITED STATES PATENTS

| | | | |
|---|---|---|---|
| 919,300 | 4/1909 | Anderson | 137/492 |
| 1,105,134 | 7/1914 | Hanemann | 137/543.13 X |
| 1,189,334 | 7/1916 | Anderson | 137/488 X |
| 1,357,837 | 11/1920 | Bouvier | 137/489 |
| 1,814,530 | 7/1931 | Spence | 137/489 |
| 1,873,318 | 8/1932 | Eason, Jr. | 137/533.21 |
| 2,655,935 | 10/1953 | Kinzbach | 251/337 X |
| 2,755,816 | 7/1956 | Collins | 137/533.17 X |
| 2,912,000 | 11/1959 | Green | 137/533.21 X |
| 3,026,800 | 3/1962 | Foster | 137/467 X |

*Primary Examiner*—Alan Cohan
*Attorney, Agent, or Firm*—Hubbard, Thurman, Turner & Tucker

[57] ABSTRACT

A highly responsive valve for exhausting high pressure combustion gases from a closed combustion chamber upon the occurrence of a predetermined pressure is disclosed. A valve housing defines a cylindrical pressure chamber adapted for connection to a combustion chamber. A cylindrical valve sleeve is reciprocably guided along the chamber interior wall from a first position blocking directionally oriented outlet ports in the chamber to a second position opening the outlet ports to rapidly discharge combustion gases from the pressure chamber. The lower edge of the sleeve seats against a cover plate in the first position and defines an annular pressure chamber with the grooved seat. A pilot valve houses a reciprocable piston which controls communication between the pressure chamber and the valve chamber. The pilot valve piston is pressure biased to a position blocking communication between the pressure and valve chambers and the pilot valve piston shifts in response to a predetermined pressure rise in the valve pressure chamber to communicate the annular pressure chamber with high pressure to cause the valve sleeve to be rapidly accelerated to a full open position. Ring springs limit the sleeve travel and absorb the energy of the accelerating sleeve. The valve sleeve is provided with an internal shoulder area exposed to the pressure chamber so that combustion chamber pressure prior to ignition acts to positively hold the sleeve seated. Lubricating fluid is introduced in a valve guided slot of the valve sleeve and valve housing wall surfaces so that lubricant is prevented from entering the interior pressure chamber.

21 Claims, 7 Drawing Figures

SLEEVE VALVE

This is a continuation of application Ser. No. 365,629, filed May 31, 1973 now abandoned.

The present invention relates to a sleeve type valve and more particularly relates to an exhaust valve for releasing combustion gases from repetitive explosive devices as shown and described in U.S. Pat. No. 3,461,577.

The present invention is directed to an apparatus for the utilization of combustion energy from hydrocarbon fuels for performing useful work as shown in the above-referenced patent. The referenced patent shows a method and apparatus for repetitively displacing material by exploding a hydrocarbon fuel in a closed combustion chamber and directing the high pressure exhaust gas against the material to fragment and displace the material. The combustion chamber is provided with carburization means for charging a fuel mixture under pressure into the combustion chamber. Combustion is initiated in the mixture by a suitable ignitor such as a spark or glow plug. An exhaust valve is provided for sealing the combustion chamber until a predetermined pressure is reached in the chamber subsequent to combustion. Thereafter the exhaust valve opens so that the high pressure and temperature gases and combustion products are rapidly released and directed to fragment the soil.

In addition to the use of the combustion gases for fragmenting and dislodging soil and rock, other applications of this general type of device are also found in the prior art. For example, U.S. Pat. No. 3,572,273, shows the use of the repetitive combustion principle applied to the breaking and melting of ice. In this patent, a repetitive explosive apparatus is carried on a buoyant vessel such as a ship. Exhaust openings in the hull of the ice breaker vessel are brought into contact with the ice. The combustion gases exhausting rapidly through the exhaust vents provide an explosive release of energy which acts against the ice to produce an impact which causes fragmentation and melting of the ice.

Repetitive combustion explosion devices also have many other applications such as in conjunction with propulsion devices or for the production of seismic shock waves.

The effectiveness of repetitive explosion devices as described above, is dependent upon an exhaust valve which effectively seals off the combustion chamber until a predetermined pressure buildup and explosive force occurs in the chamber and then thereafter quickly opens to rapidly release the high pressure and temperature gases created by the explosion to perform the necessary work. The prior art devices in this field generally rely upon some type of poppet valve controlling communication between the combustion chamber and atmosphere. For example, above-mentioned U.S. Pat. No. 3,461,577, shows a spring biased poppet valve which carries a control piston on its stem. During charging of the device, the pressure in the combustion chamber acts against the piston to hold the poppet in a closed position. Upon combustion, and rapid pressure buildup, pressure forces exerted against the back area of the valve overcome the combined opposing force of the piston and spring to allow the valve to open and release explosive gases from the combustion chamber. The admission of combustion gas pressure against the piston is restricted at an orifice so that the pressure rise against the piston lags the pressure acting against the back area of the poppet to permit the valve to open.

U.S. Pat. No. 3,572,273, similarly shows the use of a poppet valve controlling the release at the exhaust opening in the valve. The valve stem carries a piston which is opened in response to fluid pressure applied to one side of the piston. The admission of fluid pressure to open the exhaust valve is controlled by an actuating valve which, for example, may be responsive to pressure in the combustion chamber through a pressure switch or other suitable sensing means.

While the poppet valves of the type described above comprise an effective means of releasing combustion energy, certain disadvantages are attendant to the use of poppet valves. In large volume repetitive explosion devices, poppet valves having substantial size and mass are required. A practical limitation exists on the size of poppet valves operating at the temperatures and pressures occurring in devices of this general type. The high stresses imposed under these operating conditions require an extremely high poppet mass for adequate cooling and strength. Such a valve accordingly has high inertia and rapid opening and acceleration of the valve requires considerable energy. Directing control pressure fluid to one side or the other of a control piston associated with a poppet valve requires additional, complex hydraulic circuitry. Such systems also have inherently slower response times.

Thus as seen from the above, it has been clearly demonstrated that a need exists for an exhaust valve which can efficiently and rapidly operate to release pressure in repetitive explosion devices of the type described above. Accordingly, the present invention provides a sleeve type exhaust valve adapted for connection to a combustion unit. The valve comprises a generally cylindrical valve body having one or more ports in the valve body. A cylindrical valve sleeve is reciprocable along the interior surface of the valve body and seats on a bottom cover plate defining an annular pressure chamber with the seat. In the seated position, the valve sleeve closes off directionally oriented exhaust ports in the valve body. Combustion chamber pressure during charging of the unit acts against a shoulder on the sleeve and biases the sleeve to a closed position. In the open position, the valve sleeve is reciprocated upwardly to open the ports to the combustion chamber. A pressure operated pilot valve is provided in the bottom cover plate of the unit which controls communication between the valve interior and the annular pressure chamber. The pilot piston is biased to a closed position by a predetermined external pressure food. When combustion occurs, the combustion chambers pressure rises rapidly and moves the pilot piston against its pressure bias to allow combustion gas to be communicated to the annular pressure chamber and be exerted against the lower edge of the valve sleeve. The force of the combustion gases acting against the valve sleeve causes the valve sleeve to unseat sufficiently for additional pressure to act against the valve to rapidly accelerate the valve upwardly to open the exhaust ports and release high pressure combustion gases. The upward travel of the valve sleeve is limited by a set of ring springs which absorb the energy of the sleeve. Lubrication is provided at ports which inject a suitable oil between the interior of the valve body and the exterior of the internal valve sleeve. After discharge of the combustion gases, the sleeve returns to its closed position seated against the cover plate.

The sleeve valve described above has distinct advantages over the poppet type valve previously found in the prior art. The sleeve valve being symmetrical, expands uniformly with temperature increases reducing problems of interference and valve sticking. Further, the valve sleeve is guided along its full exterior surface so that cocking and tipping of the valve sleeve is avoided. An important advantage resides in the response characteristics of the valve. Compared with conventional poppet valves, the valve of the present invention has a much better response time, in the order of ¼ the opening time required for a conventional poppet type valve. This is partially due to the reduced inertia and mass. Further, the sleeve valve requires only a simple pilot operated valving arrangement for actuation. The use of external pressure responsive control valves and pressure sensing apparatus is not required.

The above and other objects and advantages will become apparent from the following specification, claims and drawings, in which:

Figure 1:
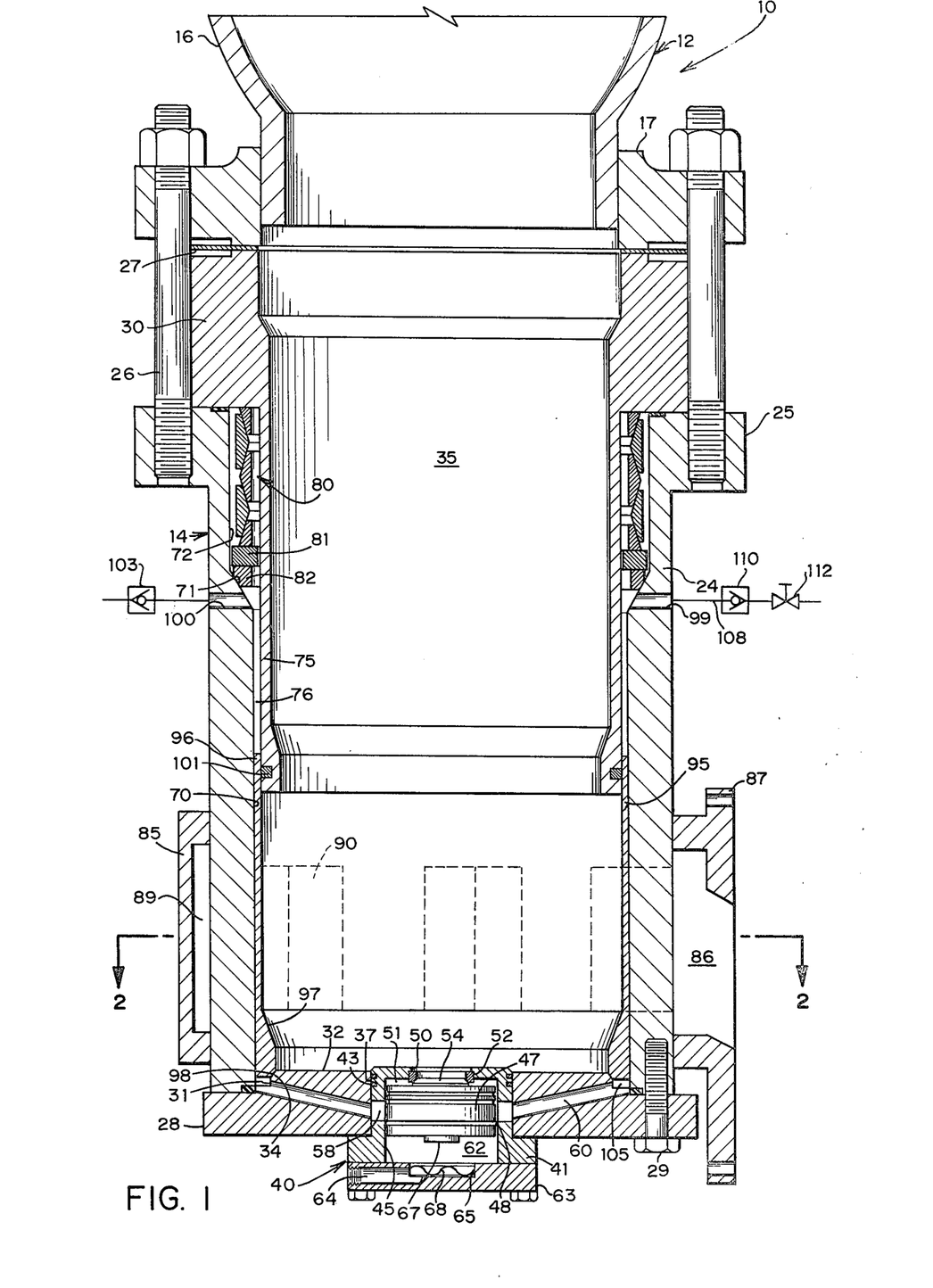
FIG. 1 is a cross-sectional elevational view of the valve of the present invention shown in conjunction with a portion of a combustion chamber of an explosive device.
Figure 3:
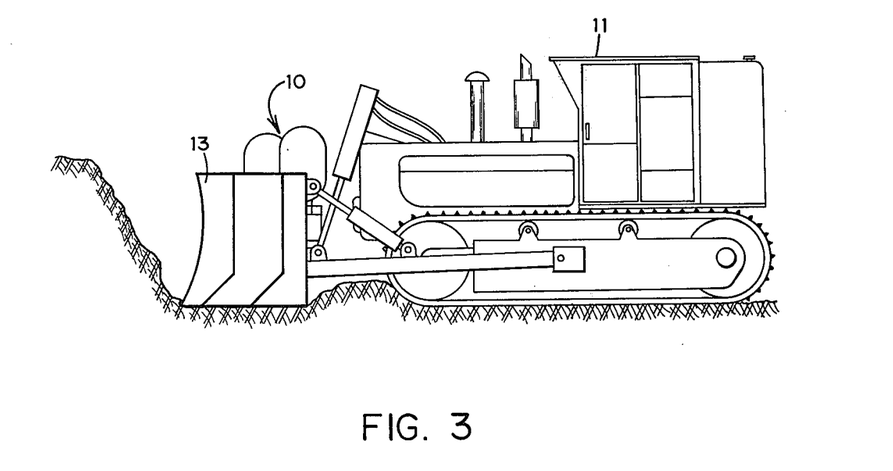
FIG. 3 is a view showing the combustion device mounted in a typical position of use on the blade of a crawler tractor.

Referring now to the drawings, and particuarly to FIG. 1, the reference numeral 10 generally indicates a repetitive explosive device for generating explosive force having a combustion chamber 12 and a quick response exhaust valve section 14. The unit 10 is mounted to perform useful work. FIG. 3 shows a typical application with unit 10 mounted on the blade 13 of a crawler tractor 11. Suitable vent openings in the blade 13 direct the gases released by the exhaust valve into the soil. As pointed out above, the repetitive combustion devices are applicable to a wide variety of uses, and the device could be similarly carried on the forward or bow portion of an ice breaking vessel or mounted in other positions of use.

Combustion chamber 12 is defined by generally cylindrical or domed housing 16 having a lower circular flange portion 17 welded to housing 16. The combustion chamber is partially represented in FIG. 1 and shown in simplified form in FIGS. 4 to 7. It will be understood that the combustion chamber design is described only as necessary as it contributes to the understanding of the present invention, the combustion chamber per se not forming a part of the present invention. Air inlet 18 is connectable to a source of compressed air to charge the combustion chamber under the control of an appropriate air inlet valve not shown. The incoming compressed air may be preheated to improve combustion efficiency within the combustion chamber 12. Combustion chamber 12 also includes a fuel inlet 20 suitable for injection of a combustible fuel, preferably a hydrocarbon fuel such as diesel oil, which is sprayed into the chamber under pressure. It will be obvious that in some installations the carburization of the combustion chamber can be carried out by a single fuel injection nozzle to provide the proper air fuel mixture.

Combustion is initiated in the combustion chamber 12 by ignitor 22 preferably located in the central area of the combustion chamber 12. The ignitor may be an electrically actuated spark plug or a glow plug or similar ignitor device.

As best seen in FIG. 1, valve 14 is located subjacent the combustion chamber and includes a generally cylindrical valve housing or body member 24 having circular flange 25 adapted to align with flange 17 of the combustion chamber. The combustion chamber is fastened to valve 14 by appropriate studs 26 with gasket 27 sealing the connection. Cylindrical spacer 30 is secured between the respective flanges. A bottom cover plate 28 is secured to the bottom edge of housing member 24 by cap screws 29 to define valve interior chamber 35 which directly communicates with the combustion chamber. The interior surface 32 of the cover plate 28 is provided with an annular groove 31 which extends peripherally around the surface 32 adjacent the inner walls of housing member 24. Groove 31 is defined by a generally flat bottom surface and inwardly tapering seat surface 34.

A concentric bore 37 in cover plate 28 receives pilot valve assembly 40. Pilot valve 40 has a generally cylindrical body 41 closely fitting within bore 37. Gas pressure within the combustion chamber and valve is prevented from leaking along the pilot valve and cover plate surfaces by annular sealing rings 43. Pilot valve body 41 defines internal cylinder bore 45. A piston 47 is reciprocable within bore 45 and divides the bore 45 into opposed cylinder chambers 51 and 62. Piston ring 48 seals the surfaces at the piston and bore 45. The interior end of pilot valve 49 is provided with reduced diameter passage 50 communicating pilot valve chamber 51 with the interior 35 of valve 14. Annular valve seat 52 is positioned within passage 50. Axial shoulder member 54 on piston 47 is adapted to sealingly engage valve seat 52 when piston 47 is in its uppermost position.

Radial ports 58 communicate with the interior of pilot valve 40 at intermediate locations along the bore 45 so that when piston 47 is in its uppermost position, ports 58 are completely blocked. Passages 60 communicate radial ports 58 with peripheral groove 31 in bottom cover plate 28.

Inlet passageway 64 radially extends in pilot valve end plate 63 and communicates with pilot chamber 62 at concentric openings 65. Inlet 64 is conventionally threaded to accommodate an air supply line fitting. Resilient means 68, in the form of a spring or wave washer, is seated within bore 65 to serve to engage stop member 67 carried on the piston as the piston moves rapidly downward.

The interior surface of the valve housing 24 is stepped having lower diametral surface 70 which enlarges at tapered shoulder section 71 to increase diametral section 72. A cylindrical liner 75 extends downwardly in housing 24 to an elevation below shoulder 71 and is spaced apart from cylindrical surface 70 to define annular valve guide slot 76. Liner 75 may be integrally formed as part of valve housing 24 or is preferably formed as a part of spacer member 30 to facilitate fabrication and assembly. A ring spring assembly 80 is housed between the exterior of liner 75 and the surface 72 of the valve housing. Ring springs are well known and are characterized by their exceedingly high spring rate. Annular impact washer 81 occupies a position at the lower end of the spring assembly and is adapted to be impacted by the upper edge of valve sleeve 95 as will be explained later. A retainer member 82 extends around the lower end of the spring assembly 80 and is cooperable with taper 71 to hold spring assembly 80 in place.

Figure 2:
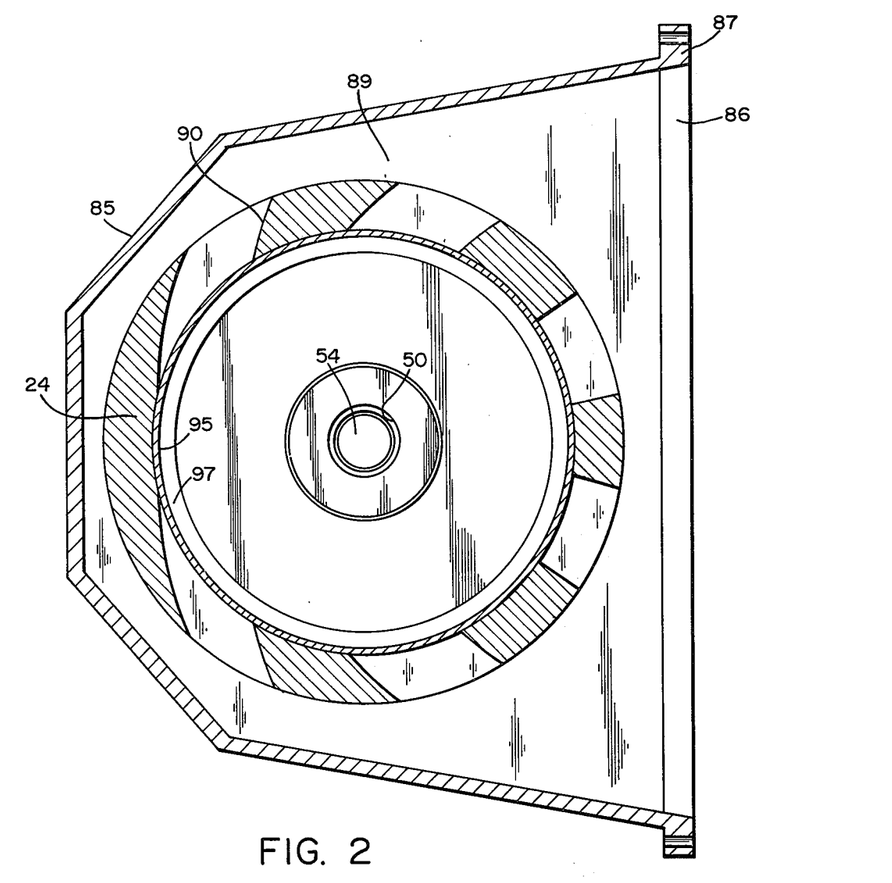
FIG. 2 is a cross-sectional view taken along lines 2—2 of FIG. 1.

Exhaust manifold 85 forms a chamber 89 enclosing the lower portion of valve body 24. Chamber 89 terminates at outlet 86. Appropriate flange 87 is provided around the outlet 86 to accommodate attachment of the unit to a suitable frame such as a crawler tractor dozer blade 13. Manifold chamber 89 communicates with the interior 35 of valve 14 through a series of exhaust ports 90 in the lower part of housing 24. As best seen in FIG. 2, exhaust ports 90 are not radial with respect to housing 24 but are preferably arranged or oriented to direct the high velocity exhaust gases toward the main outlet 86 of the exhaust manifold 85.

Valving of ports 90 is accomplished by valve sleeve 95 which has an upper cylindrical wall section 96 slidable within valve guide slot 76. The lower end of the valve sleeve 95 tapers inwardly at 97 forming shoulder or surface area against which pressure within chamber 35 can act. The lower end of sleeve 95 is tapered at 98 so the sleeve will sealingly engage surface 34 of plate 28 when valve sleeve 95 is in the lowermost or closed position. Annular pressure chamber 105 is defined by the lower edge of the sleeve and groove 31.

Several radial vents 99 communicate with slot 76 to permit release of air as sleeve 95 moves rapidly upward in the slot. One of the vents 99 may be connected to a source of air pressure across check valve 110 and line 108. Manual valve 112 controls admission of air into slot 76 for assisting return of valve sleeve 95, as will be more fully explained hereafter.

Lubricating ports 100, for being typical, open at tapered shoulder 71 to allow introduction of a suitable lubricant into the valve guide slot 76. An automatic or operator controlled oil pump periodically injects lubricant across check valve 103 and through line 102 and port 100 into guide slot 76. Appropriate sealing ring 101 is provided at the inner surface of liner 75 and contacts the inner surface of the valve sleeve to prevent gas leakage from chamber 35 into slot 76. Sealing ring 101 also serves to prevent leakage of lubricating oil into the interior of the valve and the combustion chamber.

In operation, the unit 10 is mounted to perform useful work such as on a tractor blade 13 for soil displacement as seen in FIG. 3. The associated compressor and fuel supply are mounted on the unit and connected, respectively, to air inlet 18 and fuel inlet 20. FIGS. 4 through 7 pneumatically show the cycle of operation of the exhaust valve of the present invention. The compressor may be a conventional reciprocating or vane type or, preferably due to size and weight considerations, may be a turbine. The fuel and air may be separately introduced or the fuel may be introduced along with the pressurized air charged into the chamber. Appropriate carburetion control such as valving to regulate the correct air fuel mixture is also provided. Ignition is obtained by spark plug 22 activated, for example, by a vibrating contact system having a high voltage coil. Multiple spark plugs may be utilized, depending on the size and configuration of the unit. Firing controls are relatively simple and consist of appropriate solenoid valves in the air supply lines to switch off the air valves when the desired charging pressure is reached. Switches in the electrical system energize the spark plugs and firing subsequent to charging. Gas release will occur automatically by virtue of the exhaust valve 14 as will be described hereafter. The support system is generally conventional and need not be described in further detail.

A source of pressurized air is connected at inlet 64 to pressurize piston chamber 62 and act against the lower surface of piston 47. The pressure force exerted at chamber 62 will urge piston 47 to its upper position with member 54 tightly engaging valve seat 52 closing communication between piston chamber 51 and the interior 35 of valve at passage 50. The cross-sectional area of piston 47 at chamber 62 determines the total closing force exerted against the piston. The area of axial member 54 exposed to valve chamber 35 at passage 50 is substantially less than the area of piston 47 so that a substantially higher pressure acting at the surface of member 54 is required to move piston 47 downwardly against its pressure bias exerted at chamber 62.

Figure 4:
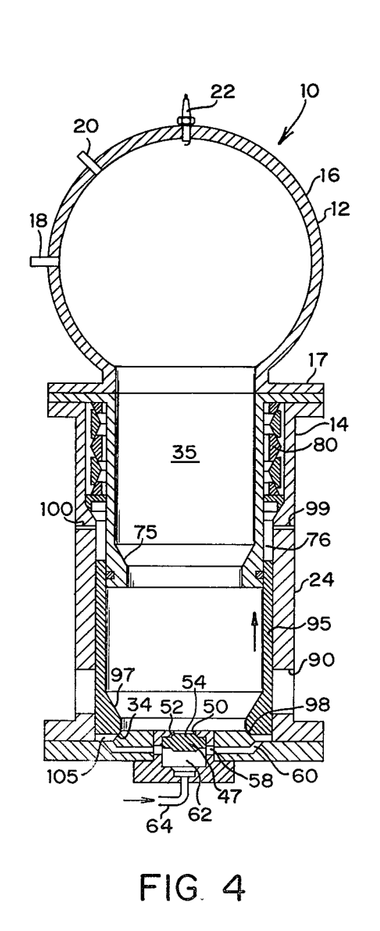
FIGS. 4 to 7 represent operating cycle of the valve of the present invention and associated combustion chamber shown in simplified schematic form.

At the beginning of the ignition cycle, the unit is in a position as shown in FIG. 4. Valve sleeve 95 is positioned in a closed position with lower edge 98 seated against tapered shoulder 34 of the lower cover plate. With the combustion chamber pressurized with the proper fuel and air mixture, valve sleeve 95 is held with surface 98 seated against surface 34 by gravity and by the pressure force exerted at surface 97. The pressure bias exerted by the combustion volume in the chamber tightly seals the valve against leakage.

Figure 5:
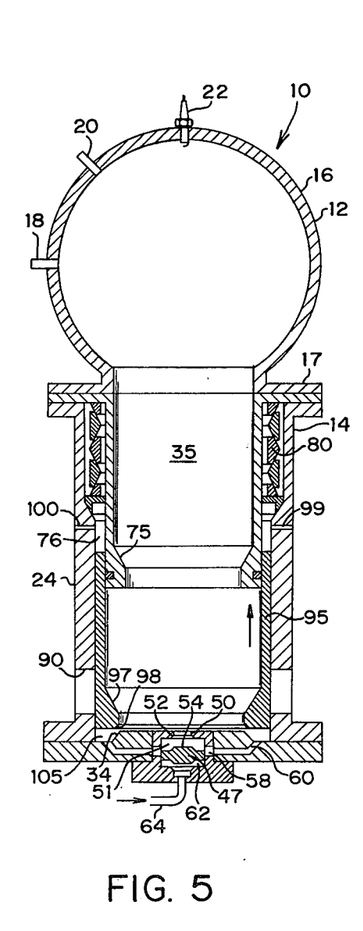
Figure 6:
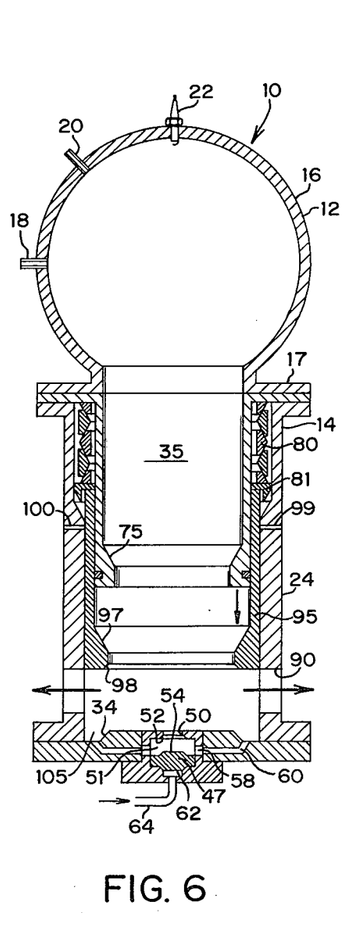
Figure 7:
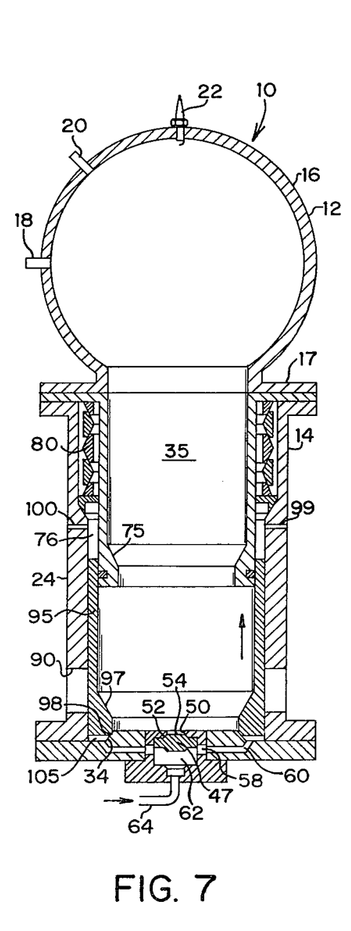

Firing or ignition in the unit is initiated by actuating the appropriate switch in the electrical control circuit to spark the ignitor 22. This will cause the explosive mixture in the combustion chamber to combust. The gas generated from the combustion causes a rapid increase in the pressure and temperature within the combustion chamber. The combustion pressure further acts against surface 97 of the valve sleeve 95 to hold the valve sleeve tightly seated during the combustion. The combustion pressure also acts against the area of piston member 54. The high pressure in the combustion chamber and valve will overcome the pressure bias acting at the opposite side of piston 47 in chamber 62. Piston 47 will be accordingly moved downwardly away from valve seat 52 to engage spring 68. Once piston 47 moves downwardly away from seat 52, combustion pressure will act against the full cross-sectional area of piston 47 in chamber 51 and rapidly move piston 47 downwardly placing cylinder chamber 51 in communication with radial ports 58. This will establish communication with valve chamber 35 and permit high pressure exhaust gases to be introduced to the annular chamber 105 through passages 60. The effective area at the underside of the valve sleeve 95 is larger than the effective area of tapered section 97 exposed to the pressure in the combustion chamber. Thus the pressure force acting at chamber 105 will cause valve sleeve 95 to unseat and move upwardly as seen in FIG. 5. Immediately as valve sleeve 95 unseats at shoulder 34 the full cross-sectional area of the sleeve will be exposed to the high combustion pressure and the sleeve will be rapidly accelerated upwardly to open position as seen in FIG. 6 to discharge the combustion gases. The volume of gas sorted through the pilot valve 40 to unseat sleeve 95 is very small as compared to the volume of the unit. Once the sleeve is unseated the gas pressure in chamber 35 acts directly on the sleeve to accelerate the sleeve. The high pressure exhaust gases are discharged through ports 90 into the manifold chamber 89 and directed by main port 86 to perform the desired work. At the upper end of the sleeve travel, momentum developed by valve sleeve 95 is absorbed by ring springs 80 as the sleeve impacts washer 81. Upon discharge of the combustion gases and reduction of pressure in chamber 35, valve sleeve 95 is returned to its seated position by gravity and by virtue of spring 80. The valve, as seen in FIG. 7, is positioned to be actuated on a new cycle of operation. By using one of the ports 99 to introduce air pressure on the top surface of sleeve 95, the sleeve can be returned to a closed position without gravity assistance, allowing the valve to be operated in any operation. Introduction of air pressure is controlled by manual valve 112 and check valve 110.

Lubrication of the valve sleeve is provided by injecting oil periodically by means of a pneumatically operated oil pump into the unit at ports 100. This can be controlled by an operator actuated lubrication switch on the control panel. The injection of oil lubricates the surfaces between the exterior of the valve sleeve 95 and the interior of the valve housing 24. A number of lubricants can be used but the one chosen should be selected on the basis of the residue or ash resulting from burning of the oil. The oil and residue from burning of the oil will ultimately work down to the exhaust ports 90 to be carried away by the high pressure and gas. Substantially no oil will be introduced into the interior of the combustion unit or the valve due to the sealing rings 101 at the interior of the valve sleeve. With this design the valve sleeve is substantially self-cleaning with residue or ash which can result in operational problems being carried away in the exhaust gases.

From the above description it will be seen that the sleeve guided exhaust valve of the present invention provides substantial advantages over poppet type and other type valves found in the prior art. The sleeve type valve with the same weight allows a much higher flow rate than does prior art valves. The large diameter cylindrical guide surface adequately guides the opening and closing of the valve and resists tipping and cocking of the valve sleeve. The pilot valve arrangement is highly reliable and trouble free and simple in design. Since the volume of gas required to be ported through pilot valve 40 to initiate valve operation is small, the pilot valve and pilot valve porting can be relatively small and compact. The symmetrical valve configuration avoids sticking of the valve as expansion of the valve due to temperature, is uniform around the valve and valve sleeve and housing. The configuration of the valve sleeve having an enlarged interior surface exposed to pressure within the combustion chamber acts to positively hold the valve in a closed seated position until the prior art pressure lifts the valve off.

Thus, in summary, the present invention provides a new and novel valve not found in the prior art. The valve of the present invention is well adapted to carry out the objects and obtain the ends and advantages discussed above as well as others inherent in the design and the valve of the present application.

What is claimed is:

1. A quick opening and closing sleeve valve for controlling the discharge of fluid under pressure generated by a series of repetitive explosions at a relatively rapid rate comprising:

an upright housing member defining an interior pressure chamber adapted to receive said fluid pressure at said relatively rapid rate;
at least one outlet port in said housing member in fluid communication with said interior pressure chamber;
a sleeve vertically disposed in said interior pressure chamber and freely slidable relative to said housing member in response to a fluid pressure, said sleeve movable at least in part because of gravity between a first position blocking off the fluid communication between said outlet port and said interior pressure chamber and a second position permitting such communication, said sleeve having a valve actuation surface sealed from communication with said interior pressure chamber in said first sleeve position;
valve seat means associated with said housing and adapted to engage said sleeve in sealing engagement in said first sleeve position;
means associated with the end of said sleeve opposite the sealing surface thereof during only the latter part of the travel of said sleeve from said first position to said second position, and during only the first part of the travel of the sleeve from said second position to said first position, for aiding in the automatic closing of said sleeve in said first position at the end of each cycle of operation of said sleeve valve; and
pilot valve means controlling communication between said source of fluid pressure and an actuation surface associated with said sleeve, said pilot means including means responsive to a predetermined rise in pressure to shift said pilot valve to communicate said pressure to said valve actuation surface thereby actuating said sleeve to said second position.

2. The valve of claim 1 wherein said pilot valve means comprise a cylinder bore having a piston therein dividing said bore into first and second chambers said piston controlling communication between said actuation surface and said interior chamber and having a first position blocking communication therebetween and shiftable to a second position by a predetermined pressure to establish communication therebetween.

3. The valve of claim 2 wherein said piston is pressure biased to said first position.

4. The valve of claim 3 including resilient means associated with said second chamber adapted to absorb movement of said piston from said first to said second position.

5. The valve of claim 1 wherein said sleeve is positioned in sliding relationship with the interior surface of said chamber and wherein said sleeve is configured having a biasing surface against which internal pressure within said chamber exerts a predetermined force to hold said valve in a seated position.

6. The valve of claim 1 further including combustion chamber means associated therewith in communication with said pressure chamber adapted to generate a high pressure upon ignition.

7. A quick opening and closing sleeve valve for controlling the discharge of fluid under pressure in an earth fracturing apparatus generated by a series of repetitive explosions at a relatively rapid rate for the fracture of earth comprising:

an upright generally cylindrical valve housing member defining an interior chamber adapted to receive said fluid pressure at said relatively rapid rate, and having a generally cylindrical interior valving surface;

at least one outlet port in said housing member in fluid communication with said interior chamber and adapted to be connected to said earth fracturing apparatus;

a vertically disposed sleeve member having a generally cylindrical surface freely slidable in said interior chamber along said valving surface, said sleeve having a first position blocking the fluid communication between said interior chamber and said outlet port and a second position permitting said communication and movable from said second position to said first position at least partly because of gravity;

valve cover means enclosing an end of said valve body member, said cover having an annular recess providing a seating surface for said sleeve in said first position and defining a pressure chamber with said sleeve in said first sleeve position;

guide means slidably engaging the interior of said sleeve;

means associated with the end of said sleeve opposite the sealing surface thereof during only the latter part of the travel of said sleeve from said first position to said second position, and during only the first part of the travel of the sleeve from said second position to said first position, for aiding in the automatic closing of said sleeve in said first position at the end of each cycle of operation of said sleeve valve; and pilot valve means, said pilot valve means including a cylinder bore, a passage for providing fluid communication between said cylinder bore and said interior chamber, a piston in said bore dividing said bore into first and second opposite cylinder chambers and reciprocable between a first and second position, said piston blocking said passage in said first position, a duct connecting said interior chamber with said first cylinder chamber, means carried on said piston to close said duct when said piston is in said first position, inlet means communicating with said second cylinder chamber adapted for connection to a source of pressure fluid to pressure bias said piston to said first position, whereby upon a predetermined pressure rise in said interior chamber will shift said piston to said second position thereby placing said pressure chamber in communication with said valve interior via said duct and passage thereby actuating said sleeve to said open position.

8. The valve of claim 7 including resilient means adapted to engage said sleeve means in said open position.

9. The valve of claim 7 wherein said means associated with the end of said sleeve comprise ring springs located in a recess in said housing interior and aligned with said sleeve.

10. The valve of claim 7 wherein said sleeve valve interior surface is configured having an enlarged shoulder providing a surface area whereby internal pressure in said interior chamber biases said sleeve to said closed position, said shoulder area being less than the opposing area of said sleeve at said pressure chamber.

11. The valve of claim 10 wherein a plurality of exhaust ports are provided in said housing discharging into a common manifold.

12. The valve of claim 11 wherein said manifold is provided with a single outlet and said ports are oriented to discharge generally toward said single outlet.

13. The valve of claim 12 further including means for lubricating said slide valve.

14. The valve of claim 13 wherein said means for lubricating said valve comprise means for injecting a lubricant at the housing and valve sleeve interface and further including sealing means on said guide means engaging said sleeve to prevent leakage of lubricant into said interior chamber.

15. The valve of claim 13 wherein said pressure source means is a repetitive combustion device communicating with said valve interior.

16. A quick opening exhaust valve comprising:

an upright valve housing member having a flanged upper end adapted for connection to a source of fluid pressure and having a generally cylindrical interior valving surface defining an interior pressure chamber;

multiple outlet ports in said body discharging into a common exhaust manifold having a common outlet;

a guide member having a cylindrical exterior surface extending partway in said chamber and defining an annular guide slot with said valving surface;

a vertically disposed sleeve member having a generally cylindrical upper portion in sliding contact in said guide slot facely slidable partly because of the force of gravity along said valving surface from a first lower position blocking said outlet ports to a second upper position opening said outlet ports, said sleeve enlarging at an interior shoulder whereby pressure in said interior pressure chamber acts at said shoulder to bias said sleeve to a closed position;

valve cover plate means enclosing the lower end of said valve body, said valve cover including an annular recess adjacent the interior of said interior valving surface having a tapering surface, said tapering surface cooperating with the sleeve end in said sleeve second position to provide a seat and said recess defining with said sleeve end in said second position an annular pressure chamber;

means associated with the end of said sleeve opposite the sealing surface thereof during only the latter part of the travel of said sleeve from said first position to said second position, and during only the first part of the travel of the sleeve from said second position to said first position, for aiding in automatic closing of said sleeve in said first position at the end of each cycle of operation of said sleeve valve; and pilot valve means located in said end cover plate, said pilot valve means including a cylinder bore concentric in said cover plate having an inlet duct communicating said bore with the valve chamber, said opening being of less area than said cylinder bore, a passage communicating said bore with said pressure chamber, a piston in said bore reciprocable between a first position closing off said passage and a second position opening said chamber to said valve via said duct and passage, said piston dividing said bore into a first and second opposite chamber, means communicating with said second cylinder chamber adapted to bias said piston to said first position, whereby a predetermined pressure level in said valve interior chamber will act upon said pilot piston means to shift said piston to said second position thereby placing said pressure chamber in communication with said valve chamber thereby actuating said sleeve to said open position to discharge pressure therefrom through said ports.

17. The valve of claim 16 including spring means received in a recess in said housing and impact means aligned and interposed with said valve sleeve and said spring means.

18. The valve of claim 16 further including vent means communicating with said valve guide slot, lubricating means for selectively lubricating said valve sleeve at said valve body and sleeve surface and sealing means at said guide slot and valve sleeve surfaces.

19. The valve of claim 16 wherein said upper valve housing end is flanged.

20. The valve of claim 19 further including a combustion chamber having a flange connected to said valve flange.

21. The valve of claim 20 wherein said combustion chamber is a repetitive explosion device.

* * * * *

UNITED STATES PATENT AND TRADEMARK OFFICE
CERTIFICATE OF CORRECTION

PATENT NO. : 4,011,886

DATED : March 15, 1977

INVENTOR(S) : Charles D. Wood

It is certified that error appears in the above-identified patent and that said Letters Patent are hereby corrected as shown below:

Column 2, line 54, "food" should be —force—.

Column 5, line 37, "for" should be —four—.

Column 7, line 9, "spring" should be —springs—.

Column 10, line 29, "facely" should be —freely—.

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*